United States Patent [19]

Rauch et al.

[11] Patent Number: 5,315,427
[45] Date of Patent: May 24, 1994

[54] PAIR OF BINARY DIFFRACTION OPTICS FOR USE IN OVERFILLED RASTER OUTPUT SCANNING SYSTEMS

[75] Inventors: Russell B. Rauch, Pasadena; Ellis D. Harris, Claremont, both of Calif.

[73] Assignee: Xerox Corporation, Stamford, Conn.

[21] Appl. No.: 990,491

[22] Filed: Dec. 14, 1992

[51] Int. Cl.⁵ .............................................. G02B 26/08
[52] U.S. Cl. ..................................... 359/216; 359/569
[58] Field of Search .............................. 359/196–197, 359/212, 223, 226, 558, 563, 566, 569, 216–219, 17, 18

[56] References Cited

U.S. PATENT DOCUMENTS

| | | | |
|---|---|---|---|
| 4,895,790 | 1/1990 | Swanson et al. | 430/321 |
| 5,208,701 | 5/1993 | Maeda | 359/569 |
| 5,258,862 | 11/1993 | Harris | 359/569 |

Primary Examiner—Loha Ben
Assistant Examiner—James Phan
Attorney, Agent, or Firm—Fariba Rad

[57] ABSTRACT

An optical system is disclosed which utilizes a pair of binary diffraction optic lenses to reprofile the intensity of a light beam. Both binary diffraction optic lenses have a plurality of segments. Depending on the shape of a desired intensity profile, each segment of the first binary diffraction optic lens either diverges or converges a portion of a light beam and as needed deflects the same portion of the beam. The second binary diffraction optic lens, which is located down stream of the first binary diffraction optic lens, has an equal number of segments as the first binary diffraction optic lens. Each segment of the second binary diffraction optic lens receives the light beam from a respective segment of the first binary diffraction optic lens and collimates the light beam.

3 Claims, 6 Drawing Sheets

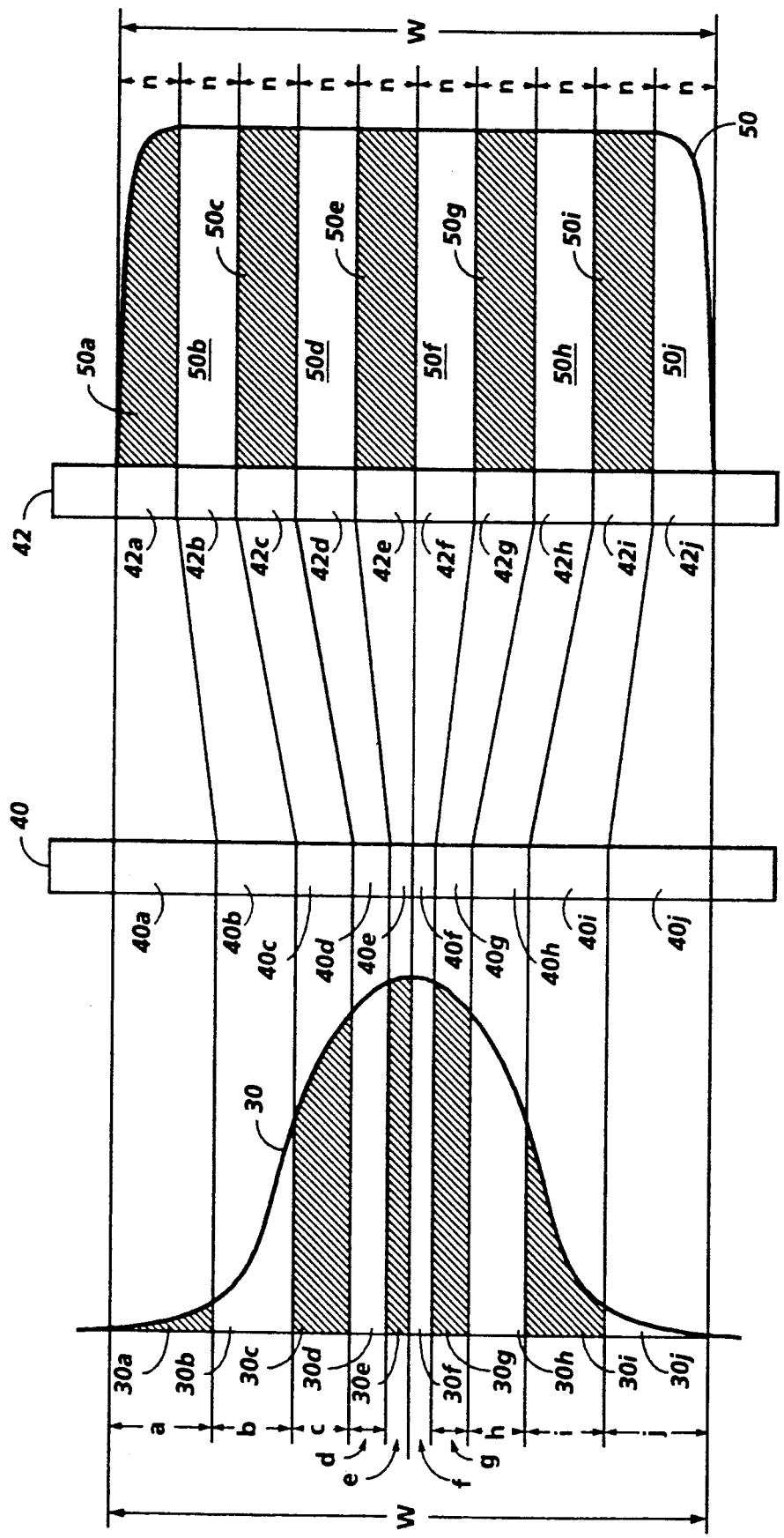

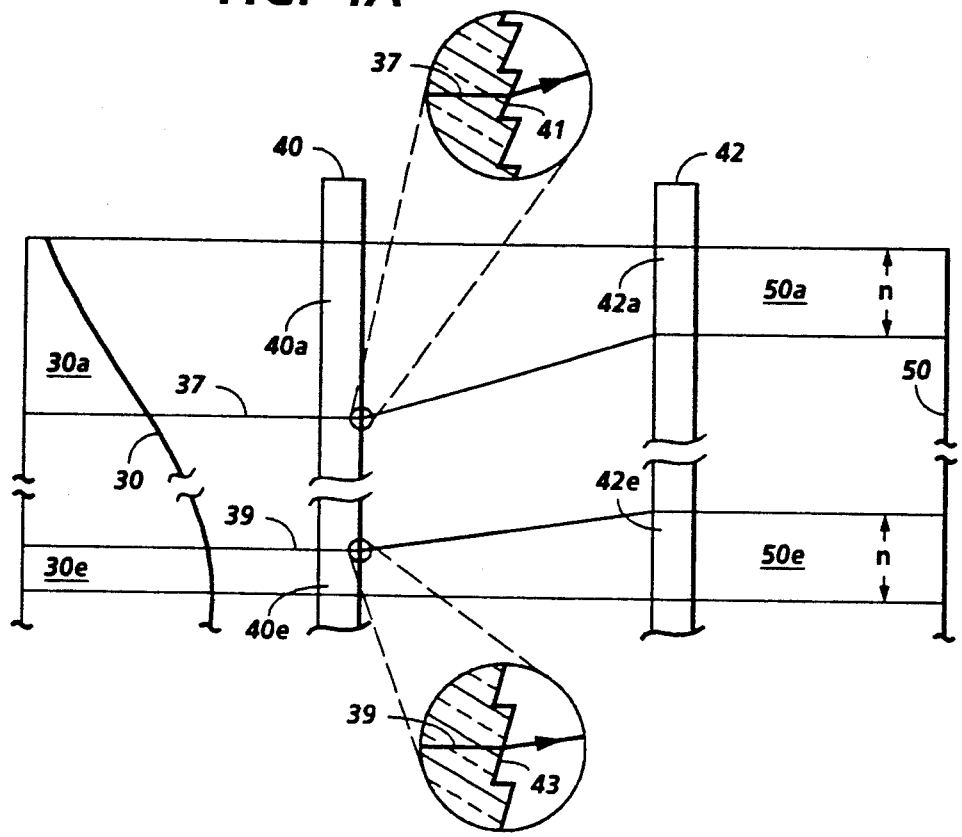
FIG. 4A
FIG. 4B
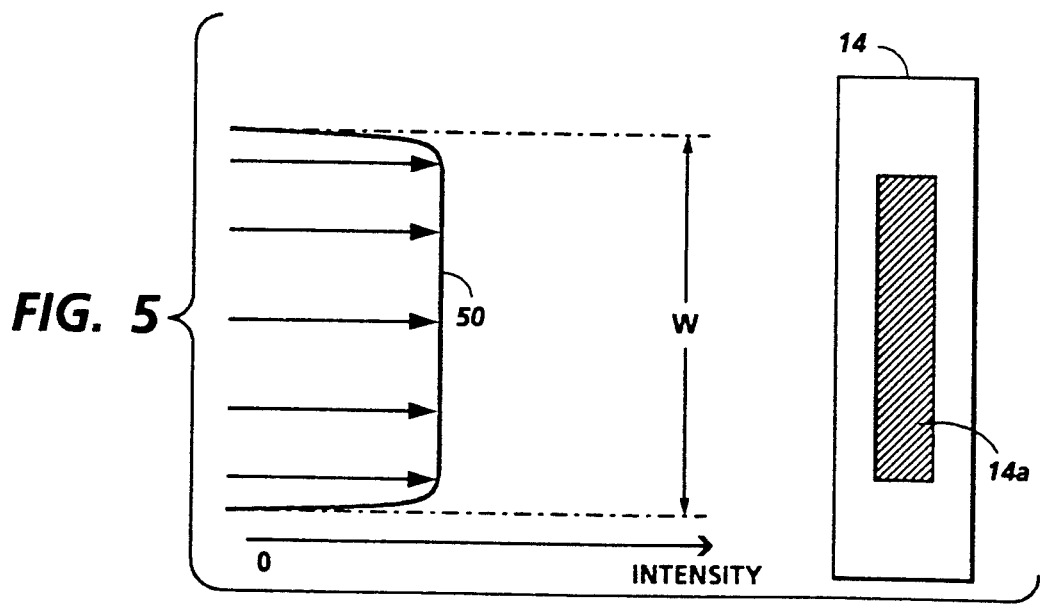
FIG. 5

PAIR OF BINARY DIFFRACTION OPTICS FOR USE IN OVERFILLED RASTER OUTPUT SCANNING SYSTEMS

BACKGROUND OF THE INVENTION

This application is related to U.S. patent application titled "Optimal Filling of a Polygon Facet by Beam Reprofiling" Ser. No. 07/990,492 (D/92542) filed concurrently herewith (common assignee).

This invention relates to an optical system which changes the intensity profile of a laser light beam from a non-uniform distribution to a uniform distribution and more specifically, to a raster scanner in which the intensity of a light source is reprofiled by a pair of binary diffraction optic lenses.

Binary diffraction optic lenses are made using the same techniques used to fabricate VLSI circuits, as disclosed in Binary Optics Technology: The Theory and Design of Multi-level Diffractive Optical Elements by G. J. Swanson of the Lincoln Laboratory at the Massachusetts Institute of Technology, (Technical Report 854, Aug. 14, 1989) and the resulting U.S. Pat. No. 4,895,790. A designer develops an idealized diffractive surface structure mathematically, then using a computer, defines a series of precise, microlithographic masks. A mask pattern is printed into a photoresist coating using a UV light source and then transferred into the optical substrate by ion milling or plasma etching.

Referring to FIG. 1, a conventional raster scanner system utilizes a light source 12, a modulator 14, a multi-faceted rotating polygon mirror 16 as the scanning element and a photosensitive medium 18. The light source 12, which is typically a laser source, emits a light beam 20 and sends it to the modulator 14. The modulator 14 receives pixel information and modulates the light beam 20 in accordance with the pixel information. The raster scanner system utilizes overfill scanning and therefore, the modulated light beam 20 will be directed onto two facets 22 of the rotating polygon mirror 16. The rotating polygon mirror 16 reflects the light beam 20 and also causes the reflected light 20 to revolve about an axis near the center of rotation of the rotating polygon 16 and scans a line. This reflected light beam 20 can be utilized to impinge upon a photographic film or a photosensitive medium 18, such as a xerographic drum at the output of the imaging system.

Referring to FIG. 2, typically, a laser light beam has a Gaussian distribution 30 which has a maximum intensity at the center C of the beam and a gradually decreasing intensity towards the outer shell S of the beam. In an overfilled raster scanner system in which a light beam is wide enough to cover at least two facets, an electro-optic crystal 14a used in the modulator 14 should be wide enough to encompass the width w of the light beam. However, since the intensity of the light beam varies from the center C of the beam to the outer shell S, the surface of the electro-optic crystal 14a of the modulator 14 does not receive a uniform intensity. The center portion Ca of the electro-optic crystal is exposed to the maximum intensity from the center C of the light beam and the rest of the electro-optic crystal is exposed to less intensity. For example in lithium niobate crystal the non-uniform light excites carriers from impurities such as iron in the crystal. These carriers move in the crystal by diffusion and under the influence of electric fields are displaced to new positions and re-trapped, which results in specially varying refractive index changes due to the electro-optic effect. This phenomenon of index variation is called the "photorefractive effect", or "optical damage" and is well documented in the literature. It is desirable in the case of information storage, but undesirable in the case of electro-optic modulator applications, since the index changes persist for long times and cause undesirable diffraction of light passing through the crystal. In particular the damage depends on the intensity of the light, which is not uniform in the case of a Gaussian beam.

Since the damage is greater near the center Ca of the electro-optic crystal, the performance of the center of the crystal degrades more than the performance of the rest of the crystal causing a non-uniform performance. As damage occurs optical absorption increases accelerating the damage, further exasperating the damage and a destructive cycle is set in motion. With a non-uniform performance, the performance of the center Ca of the crystal can drop to an unacceptable level while the performance of the rest of the crystal remains at the acceptable level. This effect is exaggerated when the intensity is sufficiently high that the outer areas can perform their proper function, resulting in excessive intensity near the crystal center leading to rapid doferoriaction. This problem can not be corrected by readjusting the modulator 14. Readjustment of the modulator 14 can correct the performance of the center of the electro-optic crystal however, it over corrects the performance of the rest of the electro-optic crystal. Therefore, an electro-optic crystal, which is damaged only at the center, is no longer useful and it has to be replaced by a new electro-optic crystal.

It is an object of this invention to change the incident light beam intensity profile from a Gaussian distribution to a uniform intensity to the electro-optic crystal and thereby produce a nearly uniform damage in the region of the crystal, which performs optical modulation. Due to the difficulty of getting uniformity at the edges of the beam, the edges of the beam are designed to be outside the electro-optically modulated region of the modulator. The uniform intensity can be applied to other optical applications such as multi-channel AO modulators, or indeed any optical system application, which requires a uniform optical beam.

It is a further object of this invention to change the intensity profile of a light beam from any intensity profile to any desired intensity profile.

SUMMARY

In accordance with the present invention, a pair of binary diffraction optic lenses are utilized to change the intensity profile of a light beam to a uniform intensity profile. For discussion purposes, both binary diffraction optic lenses of this invention can be considered divided into an equal number of segments. Each segment of the first binary diffraction optic lens either diverges or converges a portion of a light beam and, as needed, deflects the same portion of the beam. Each segment of the second binary diffraction optic lens receives the light beam from a respective segment of the first binary diffraction optic lens and collimates the light beam. In application, the segments are so small that the intensity profile change is essentially continuous.

In accordance with another aspect of this invention, a pair of binary diffraction optic lenses are utilized to change the intensity profile of a light beam from any profile to any desired profile. Both binary diffraction optic lenses of this invention have an equal number of segments. Depending on the shape of a desired intensity profile, each segment of the first binary diffraction optic lens either diverges or converges a portion of a light beam and, as needed, deflects the same portion of the beam. Each segment of the second binary diffraction optic lens receives the light beam from a respective segment of the first binary diffraction optic lens and collimates the light beam.

BRIEF DESCRIPTION OF THE DRAWINGS

FIG. 3 shows a Gaussian distribution reprofiled to a profile with a uniform intensity by a pair of binary diffraction optic lenses;

FIG. 4A is a representative magnified exaggerated lower portion of segment 40a of FIG. 3;

FIG. 4B is a representative magnified exaggerated upper portion of segment 40e of FIG. 3;

FIG. 5 shows an electro-optic crystal of a modulator exposed to a light beam with uniform intensity;

DESCRIPTION OF THE PREFERRED EMBODIMENT

Figure 1:
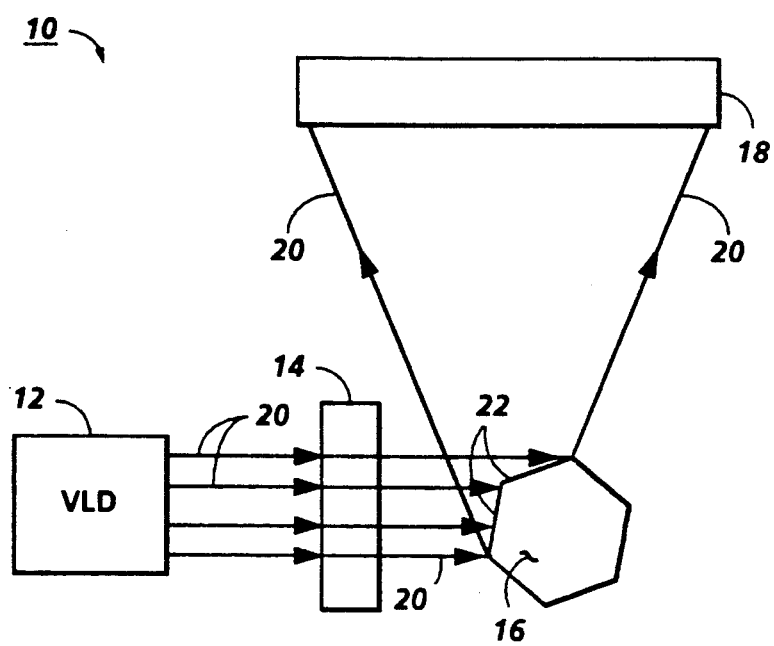
FIG. 1 is a tangential view of a prior art raster output scanner.
Figure 2:
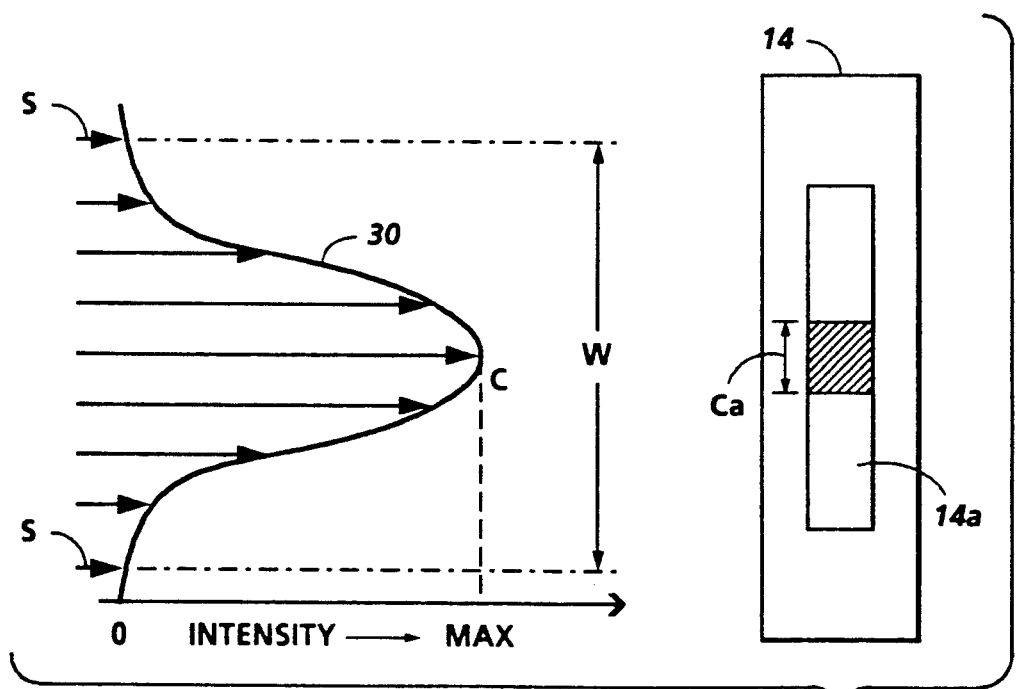
FIG. 2 shows an electro-optic crystal of the modulator of FIG. 1 exposed to a light beam with a Gaussian distribution.
Figure 3A:
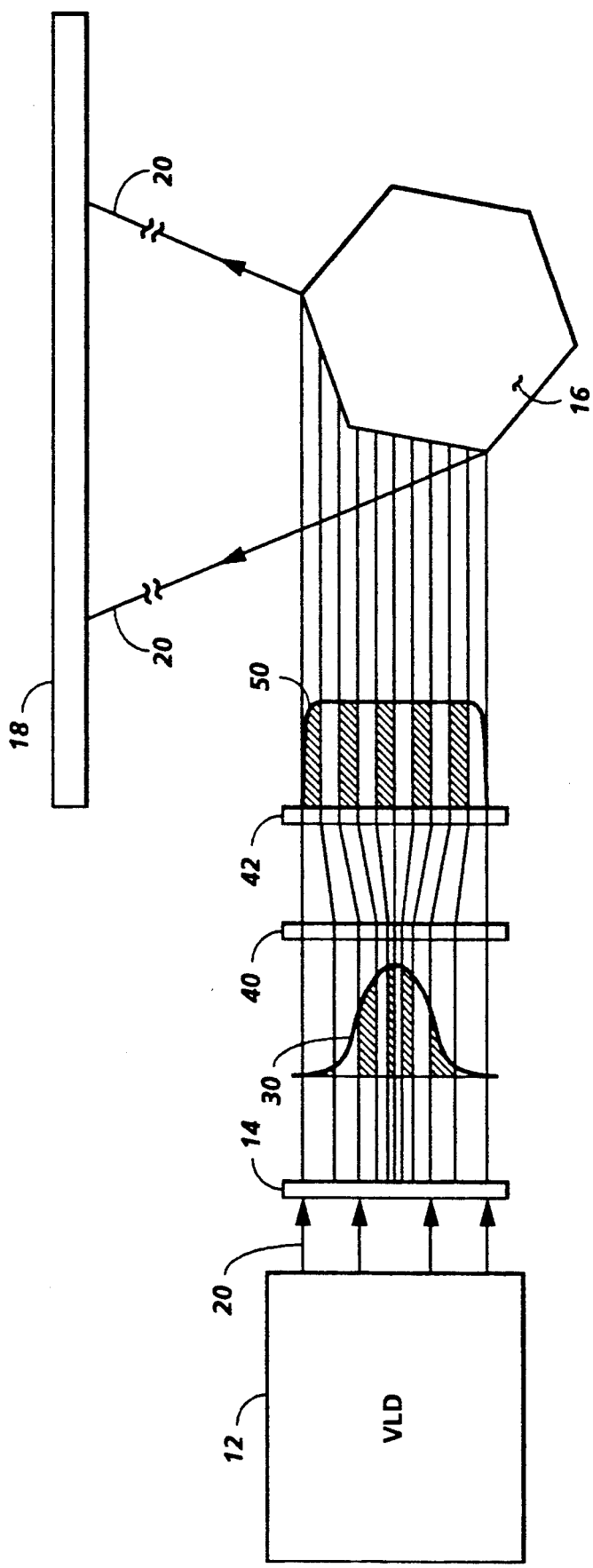
FIG. 3A shows a raster output scanner of this invention utilizing two binary diffraction optic lenses.

Referring to FIGS. 3 and 3A, there are shown two binary diffraction optics (BDO) lenses 40 and 42 reprofiling the intensity of a light beam and a raster output scanner of this invention utilizing the two binary diffraction optics lenses 40 and 42 respectively. In this invention, by using two binary diffraction optics lenses 40 and 42, the Gaussian distribution 30 of a light beam is changed to a profile 50 which has a uniform intensity profile.

Referring to FIG. 3, to design binary diffraction optic lenses 40 and 42 which can accomplish such reprofiling, the Gaussian distribution is divided into infinitesimal sections of equal energy bands 30a, 30b, 30c, 30d, 30e, 30f, 30g, 30h, 30i and 30j. Each one of the bands 30a, 30b, 30c, 30d, 30e, 30f, 30g, 30h, 30i and 30j has a width a, b, c, d, e, f, g, h, i and j respectively. The bands closer to the center of Gaussian distribution such as band 30e are narrower and have more intensity and the bands closer to the sides of the Gaussian distribution such as 30a are wider and have less intensity. However, the energy for all the bands is the same.

Also, the profile 50, which can have a width w equal to the width w of the Gaussian distribution 30, is divided into infinitesimal sections of equal energy bands 50a, 50b, 50c, 50d, 50e, 50f, 50g, 50h, 50i and 50j. Since the intensity of this profile 50 will be uniform, all bands 50a, 50b, 50c, 50d, 50e, 50f, 50g, 50h, 50i and 50h have equal widths n and contain the same energy.

To convert the Gaussian distribution 30 into profile 50, each one of the binary diffraction optic lenses 40 and 42 has to be designed to have a separate segment for each band. It should be noted that each segment has a plurality of infinitesimal stepped wedges (see FIGS. 4A and 4B). Each one of segments 40a, 40b, 40c, 40d, 40e, 40f, 40g, 40h, 40i and 40j is designed to convert the bands 30a, 30b, 30c, 30d, 30e, 30f, 30g, 30h, 30i and 30j into bands 50a, 50b, 50c, 50d, 50e, 50f, 50g, 50h, 50i and 50j respectively. Also, each one of the segments 42a, 42b, 42c, 42d, 42e, 42f, 42g, 42h, 42i and 42j is designed to collimate each one of the bands 50a, 50b, 50c, 50d, 50e, 50f, 50g, 50h, 50i and 50j respectively.

For example, segment 40a of the BDO 40 has to be capable of receiving band 30a and converge it in such a manner that when the band 30a strikes a facet, it will have a narrower width n. Since the energy of each band is kept constant, the energy of band 50a will still be the same as band 30a. However, since the band 50a has a narrower width n and the energy is constant, the intensity increases. In other words, if a wide band of light is compressed into a narrower band the intensity of the narrower band increases.

On the contrary, segment 40e of the BDO 40 has to be designed to be capable of receiving band 30e, diverging and, as needed, deflecting the band in such a manner that when it strikes a facet, it will have a wider width n. Since the width n is wider than width e and the energy is constant, the intensity decreases.

FIG. 4A shows a representative magnified exaggerated lower portion of segment 40a of FIG. 3 and FIG. 4B shows a representative magnified exaggerated upper portion of segment 40e of FIG. 3. Referring to FIG. 4A, as the lower edge 37 of band 30a passes through the segment 40a and exits from one of the stepped wedges 41 of the segment 40a, it deflects. Also, referring to FIG. 4B, as the upper edge 39 of band 30e passes through the segment 40e and exits from one of the stepped wedges 43 of the segment 40e, it deflects.

Referring back to FIG. 3, by converging the bands 30a and 30b through segments 40a and 40b of the BDO 40 and depending upon the intensity and the width of each band, by diverging or converging the bands 30c, 30d, 30e, 30f, 30g, 30h, 30i and 30j through segments 40c, 40d, 40e, 40f, 40g, 40h, 40i and 40j, a profile such as profile 50 is generated. Since the width and the energy of each band is kept constant, the intensity of all the bands will also stay constant. Therefore, The profile 50 has a uniform intensity over the entire width of the light beam.

A uniform profile such as profile 50 improves the performance of an electro-optic modulator, which has a crystal 14. Referring to FIG. 5, when an electro-optic modulator crystal 14 has a beam profile 30 of uniform intensity, illuminating the active region of the modulator 14a, the electro-optic crystal is damaged uniformly in the active region 14a and due to the uniformity of the optical damage in the crystal, the index change is approximately uniform.

In some optical applications such as raster scanner systems, only the center of the light beam can be used since the intensity of the rest of the beam is too low to be useful. The disclosed embodiment of this invention uses the light beam more efficiently since it allows utilization of a greater portion of the beam.

Figure 6:
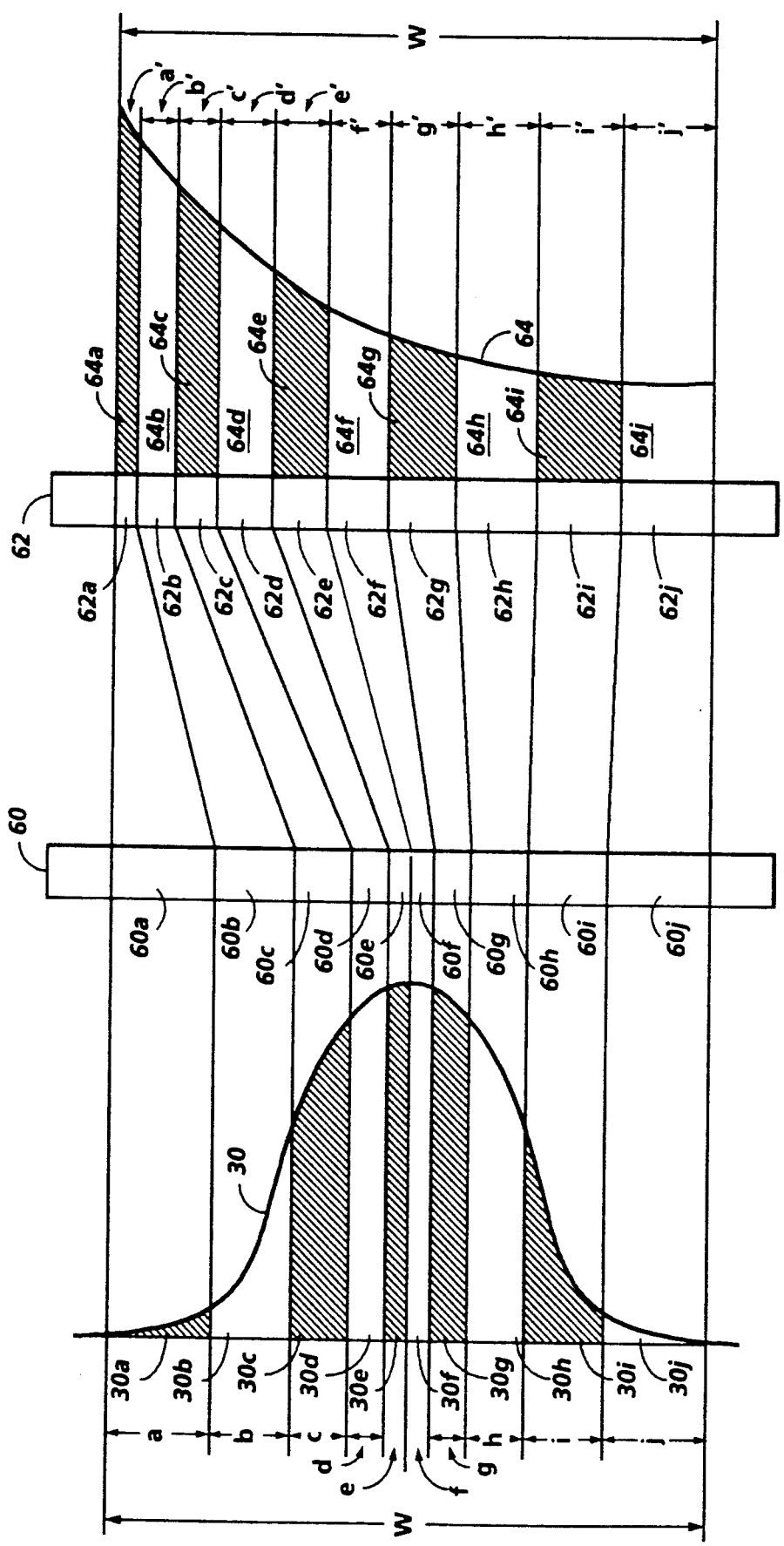
FIG. 6 shows a Gaussian distribution reprofiled by a pair of binary diffraction optic lenses to a profile with an intensity gradually decreasing from one end to the other end.
Figure 7:
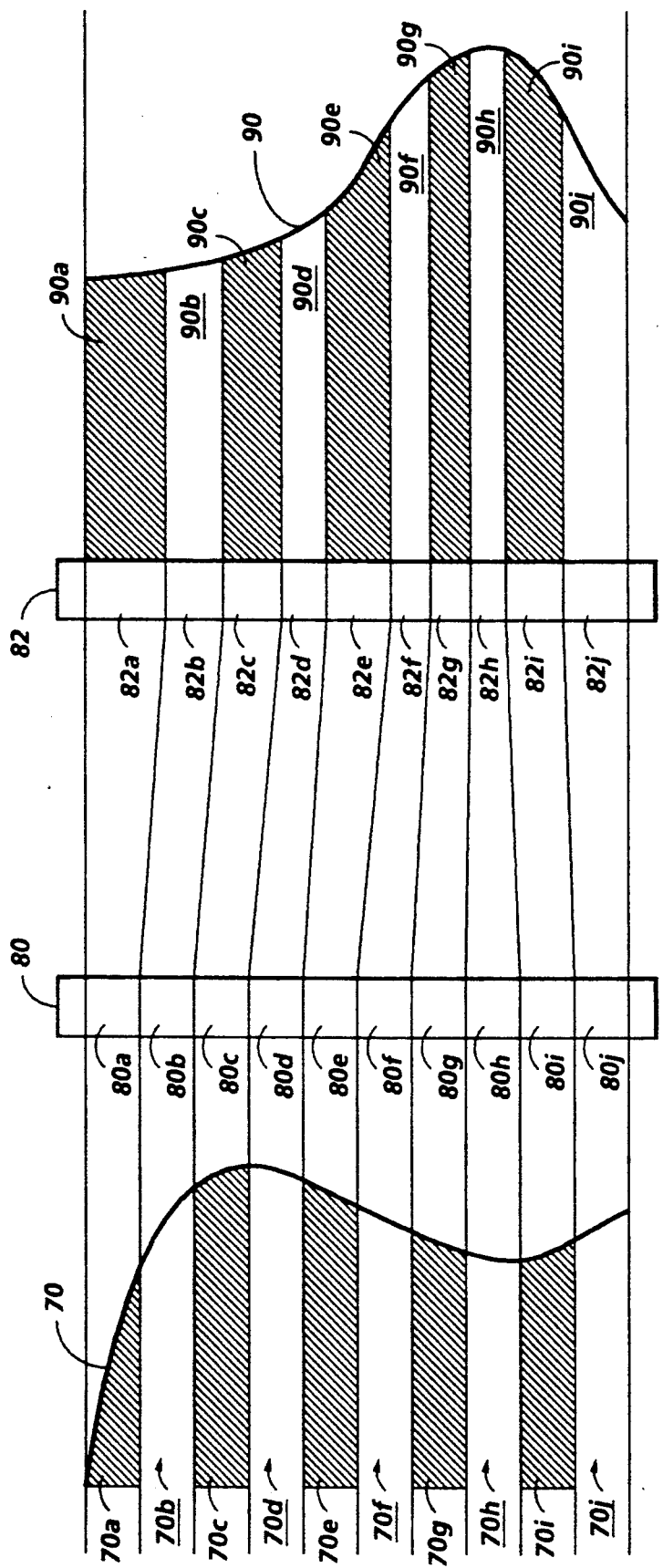
FIG. 7 shows an arbitrary intensity profile reprofiled by a pair of binary diffraction optic lenses to another arbitrary profile.

It should be noted that the BDO pair disclosed in the embodiment of this invention can be designed to reprofile any intensity profile of some given shape to any desirable intensity profile and can be used in any system which may need a certain intensity profile. FIGS. 6 and 7 illustrate the principal of this invention wherein two different intensity profiles are changed into desired profiles. FIG. 6 changes the intensity profile 30 of FIG. 3 to an intensity profile 64. FIG. 7 changes an intensity profile 70 to an intensity profile 90. FIGS. 6 and 7 show only two of the unlimited possibilities of using this invention.

Referring to FIG. 6, the profile 64, which has a width w equal to the width w of the Gaussian distribution 30, has to be divided into infinitesimal sections of equal energy bands 64a, 64b, 64c, 64d, 64e, 64f, 64g, 64h, 64i and 64j. Each one of the bands 64a, 64b, 64c, 64d, 64e, 64f, 64g, 64h, 64i and 64j has a width a', b', c', d', e', f', g', h', i' and j' respectively.

To convert the Gaussian distribution 30 into profile 64, each one of the binary diffraction optic lenses 60 and 62 has to be designed to have a separate segment for each band. Each one of segments 60a, 60b, 60c, 60d, 60e, 60f, 60g, 60h, 60i and 60j is designed to convert the bands 30a, 30b, 30c, 30d, 30e, 30f, 30g, 30h, 30i and 30j into bands 64a, 64b, 64c, 64d, 64e, 64f, 64g, 64h, 64i and 64j respectively. Also, each one of the segments 62a, 62b, 62c, 62d, 62e, 62f, 62g, 62h, 62i and 62j is designed to collimate each one of the bands 64a, 64b, 64c, 64d, 64e, 64f, 64g, 64h, 64i and 64j respectively.

For example, segment 60a of the BDO 60 has to be capable of receiving band 30a and converging it in such a manner that the band 30a will have a narrower width a' to achieve the intensity required. Since the band 30a has a narrower width a' at band 64a, the intensity increases. In other words, if a wide band of light is compressed into a narrower band intensity of the narrower band increases.

On the contrary, segment 60e of the BDO 60 has to be designed to be capable of receiving band 60e, diverging and deflecting, as needed, the band in such a manner that when it strikes a facet, it will have a wider width e' for the desired intensity decrease.

By converging the bands 30a and 30b through segments 60a and 60b of the BDO 60 and depending upon the intensity and the width of each band by diverging or converging the bands 30c, 30d, 30e, 30f, 30g, 30h, 30j and 30j through segments 60c, 60d, 60e, 60f, 60g, 60h, 60i and 60j a profile such as profile 64 is generated. It should be noted that depending on the desired profile, it might be necessary to have some segments of the BDO 60 to direct the bands through without diverging or converging the bands. Profile 64 has more intensity at one end and less intensity at the other end and a gradually decreasing intensity therebetween.

Referring to FIG. 7, to convert the given distribution 70 into some desired profile 90, each one of the binary diffraction optic lenses 80 and 82 has to be designed to have a separate segment for each band. Each one of segments 80a, 80b, 80c, 80d, 80e, 80f, 80g, 80h, 80i and 80j is designed to convert the bands 70a, 70b, 70c, 70d, 70e, 70f, 70g, 70h, 70i and 70j into bands 90a, 90b, 90c, 90d, 90e, 90f, 90g, 90h, 90i, and 90j respectively. Also, each one of the segments 82a, 82b, 82c, 82d, 82e, 82f, 82g, 82h, 82i and 82j is designed to collimate each one of the bands 90a, 90b, 90c, 90d, 90e, 90f, 90g, 90h, 90i and 90j respectively.

What is claimed is:

1. An overfilled raster scanning system comprising:
   a light source emitting a light beam;
   a binary diffraction optic lens system comprising a first binary diffraction optic lens element and a second binary diffraction optic lens element spaced along said light beam path from said first binary diffraction optic lens element;
   said binary diffraction optic lens system being arranged to receive said light beam from said light source and reprofile the intensity of said light beam;
   a photo sensitive medium; and
   a rotating scanning means arranged to receive said reprofiled light beam from said binary diffraction optic lens system and scan said reprofiled light beam across said photo sensitive medium.

2. The structure recited in claim 1, wherein said first binary diffraction optic lens element converges and diverges portions of said light beam and said second binary diffraction optic lens element collimates said light beam.

3. The structure recited in claim 1, wherein said first binary diffraction optic lens element converges portions of said light beam to compress said portions of said light beam and diverges portions of said light beam to expand said portions of said light beam to change the intensity of said portions of said light beam.

* * * * *